US012680476B1

(12) United States Patent
Freeman et al.

(10) Patent No.: US 12,680,476 B1
(45) Date of Patent: Jul. 14, 2026

(54) AXIAL LOCATING FEATURES FOR BLADE TRACK SEGMENTS IN TURBINE SHROUD ASSEMBLIES

(71) Applicant: Rolls-Royce Corporation, Indianapolis, IN (US)

(72) Inventors: Ted J. Freeman, Indianapolis, IN (US); Aaron D. Sippel, Indianapolis, IN (US); Clark Snyder, Indianapolis, IN (US); David J. Thomas, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 66 days.

(21) Appl. No.: 19/287,171

(22) Filed: Jul. 31, 2025

(51) Int. Cl.
*F01D 25/24* (2006.01)

(52) U.S. Cl.
CPC ........ *F01D 25/246* (2013.01); *F05D 2260/30* (2013.01)

(58) Field of Classification Search
CPC .... F01D 11/08; F01D 25/246; F05D 2230/64; F05D 2260/30
See application file for complete search history.

(56) References Cited

U.S. PATENT DOCUMENTS

| | | | |
|---|---|---|---|
| 6,572,331 | B1 | 6/2003 | Mohammed-Fakir et al. |
| 10,294,809 | B2 | 5/2019 | Vetters et al. |
| 10,309,257 | B2 | 6/2019 | Sippel et al. |
| 10,655,491 | B2 | 5/2020 | Shoemaker |
| 10,934,891 | B2 | 3/2021 | Freeman et al. |
| 10,968,777 | B2 | 4/2021 | Propheter-Hinckley et al. |
| 11,066,947 | B2 | 7/2021 | Sippel et al. |
| 11,174,795 | B2 * | 11/2021 | Lutjen .................. F01D 11/005 |
| 11,230,937 | B2 | 1/2022 | Freeman et al. |
| 11,286,812 | B1 | 3/2022 | Freeman et al. |
| 11,346,237 | B1 | 5/2022 | Freeman et al. |
| 11,713,694 | B1 | 8/2023 | Freeman et al. |
| 11,732,604 | B1 | 8/2023 | Freeman et al. |
| 11,773,751 | B1 | 10/2023 | Freeman et al. |
| 11,840,936 | B1 | 12/2023 | Freeman et al. |
| 2017/0002676 | A1 * | 1/2017 | Sippel .................. F01D 25/246 |

* cited by examiner

*Primary Examiner* — Brian O Peters
(74) *Attorney, Agent, or Firm* — Barnes & Thornburg

(57) ABSTRACT

A turbine shroud assembly includes a carrier segment, a blade track segment, and a locating feature. The carrier segment includes an outer wall, a first flange that extends radially inward from the outer wall, and a second flange axially spaced apart from the first flange and extending radially inward from the outer wall. The blade track segment includes a shroud wall and a first attachment flange that extends radially outward from the shroud wall. The locating feature extends axially forward from the second flange of the carrier segment to engage the first attachment flange of the blade track segment to axially locate the blade track segment relative to the carrier segment.

20 Claims, 6 Drawing Sheets

AXIAL LOCATING FEATURES FOR BLADE TRACK SEGMENTS IN TURBINE SHROUD ASSEMBLIES

FIELD OF THE DISCLOSURE

The present disclosure relates generally to turbine shroud assemblies, and more specifically to locating features of turbine shroud assemblies used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted to drive the compressor and a fan, a propeller, or an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such segments may include multiple components that are located relative to one another to minimize movement between the components during operation of the gas turbine engine.

SUMMARY

The present disclosure may comprise one or more of the following features and combinations thereof.

A turbine shroud assembly for use with a gas turbine engine may comprise a carrier segment, a blade track segment, and a locating feature. The carrier segment may be arranged to extend circumferentially at least partway around an axis. The carrier segment may include an outer wall, a first flange that extends radially inward from the outer wall, and a second flange axially spaced apart from the first flange and extending radially inward from the outer wall.

In some embodiments, the blade track segment may be supported by the carrier segment to define a portion of a gas path of the turbine shroud assembly. The blade track segment may include a shroud wall that extends circumferentially partway around the axis and a first attachment flange that extends radially outward from the shroud wall. The first attachment flange may be formed to define a recess that extends axially forward into the first attachment flange toward the first flange of the carrier segment. The locating feature may be engaged with the blade track segment to axially locate the blade track segment relative to the carrier segment so that an axial position of the blade track segment relative to the carrier segment is maintained during use of the turbine shroud assembly. The locating feature may extend axially forward from the second flange of the carrier segment into the recess formed in the first attachment flange of the blade track segment to engage the first attachment flange of the blade track segment.

In some embodiments, the recess may be a first recess and the locating feature may be a first locating feature. The first attachment flange of the blade track segment may further be formed to define a second recess circumferentially spaced apart from the first recess and extending axially forward into the first attachment flange toward the first flange of the carrier segment. The turbine shroud assembly may further include a second locating feature circumferentially spaced apart from the first locating feature and extending axially forward from the second flange of the carrier segment into the second recess formed in the first attachment flange of the blade track segment to engage the first attachment flange of the blade track segment.

In some embodiments, the locating feature may be integrally formed with the carrier segment. The blade track segment may further include a second attachment flange axially spaced apart from the first attachment flange and extending radially outward from the shroud wall. The carrier segment may further include a third flange located axially between the first flange and the second flange and extending radially inward from the outer wall and a fourth flange located axially between the third flange and the second flange and extending radially inward from the outer wall.

In some embodiments, the first attachment flange of the blade track segment may be located axially between the fourth flange and the second flange of the carrier segment, and the second attachment flange of the blade track segment may be located axially forward of the first attachment flange and axially between the first flange and the third flange of the carrier segment. The first attachment flange of the blade track segment may define an axially-forward facing surface facing toward the first flange of the carrier segment and an axially-aft facing surface facing toward the second flange of the carrier segment. The recess may extend into the first attachment flange from the axially-aft facing surface toward the axially-forward facing surface.

In some embodiments, the recess may be open on a circumferential end of the first attachment flange. The turbine shroud assembly may further comprise a mount pin that extends axially forward into the second flange of the carrier segment, through the first attachment flange of the blade track segment, and into the first flange of the carrier segment so as to couple the blade track segment to the carrier segment. The locating feature may be located circumferentially between the mount pin and a circumferential end of the turbine shroud assembly.

In some embodiments, the locating feature may include a ridge that extends axially forward and radially outwardly along the second flange of the carrier segment and a protrusion that extends axially forward from a radial outer portion of the ridge to engage the first attachment flange.

According to another aspect of the present disclosure, a turbine shroud assembly for use with a gas turbine engine may comprise a carrier segment, a blade track segment, and a locating feature. The carrier segment may be arranged to extend circumferentially at least partway around an axis. The carrier segment may include an outer wall, a first flange that extends radially inward from the outer wall, and a second flange axially spaced apart from the first flange and extending radially inward from the outer wall. The blade track segment may be supported by the carrier segment to define a portion of a gas path of the turbine shroud assembly. The blade track segment may include a shroud wall that extends circumferentially partway around the axis and a first attachment flange that extends radially outward from the shroud wall.

In some embodiments, the locating feature may be engaged with the blade track segment to axially locate the blade track segment relative to the carrier segment. The locating feature may include (i) a ridge that extends axially forward from the second flange of the carrier segment and radially outwardly along the second flange and (ii) a protrusion that extends axially forward from a radial outer portion of the ridge to engage the first attachment flange of the blade track segment.

In some embodiments, the first attachment flange of the blade track segment may be formed to define a recess that extends axially forward into the first attachment flange toward the first flange of the carrier segment. The protrusion of the locating feature may extend into the recess to engage the first attachment flange of the blade track segment. The first attachment flange of the blade track segment may define an axially-forward facing surface facing toward the first flange of the carrier segment and an axially-aft facing surface facing toward the second flange of the carrier segment. The recess may extend into the first attachment flange from the axially-aft facing surface toward the axially-forward facing surface.

In some embodiments, the recess may be open on a circumferential end of the first attachment flange. The locating feature may be integrally formed with the carrier segment. The blade track segment may further include a second attachment flange axially spaced apart from the first attachment flange and extending radially outward from the shroud wall. The carrier segment may further include a third flange located axially between the first flange and the second flange of the carrier segment and extending radially inward from the outer wall and a fourth flange located axially between the third flange and the second flange of the carrier segment and extending radially inward from the outer wall.

In some embodiments, the turbine shroud assembly may further comprise a mount pin that extends axially forward into the second flange of the carrier segment, through the first attachment flange of the blade track segment, and into the first flange of the carrier segment so as to couple the blade track segment to the carrier segment. The locating feature may be located circumferentially between the mount pin and a circumferential end of the turbine shroud assembly.

A method may comprise coupling a blade track segment with a carrier segment to support the blade track segment radially inward of the carrier segment. The carrier segment may include an outer wall, a first flange that extends radially inward from the outer wall, and a second flange axially spaced apart from the first flange and extending radially inward from the outer wall. The blade track segment may include a shroud wall and a first attachment flange that extends radially outward from the shroud wall and may be formed to define a recess that extends axially forward into the first attachment flange. The method may comprise positioning a protrusion of a locating feature in the recess of the first attachment flange. The locating feature may extend axially forward from the second flange of the carrier segment. The method may comprise engaging the first attachment flange of the blade track segment with the protrusion of the locating feature to axially locate the blade track segment relative to the carrier segment.

In some embodiments, the method may further comprise inserting a mount pin axially forward through the second flange, through the first attachment flange, and into the first flange so as to couple the blade track segment to the carrier segment. The locating feature may be located circumferentially between the mount pin and a circumferential end of the carrier segment. The locating feature may include a ridge that extends axially forward and radially outwardly along the second flange and the protrusion that extends axially forward from a radial outer portion of the ridge to engage the first attachment flange.

These and other features of the present disclosure will become more apparent from the following description of the illustrative embodiments.

DETAILED DESCRIPTION

Figure 1:
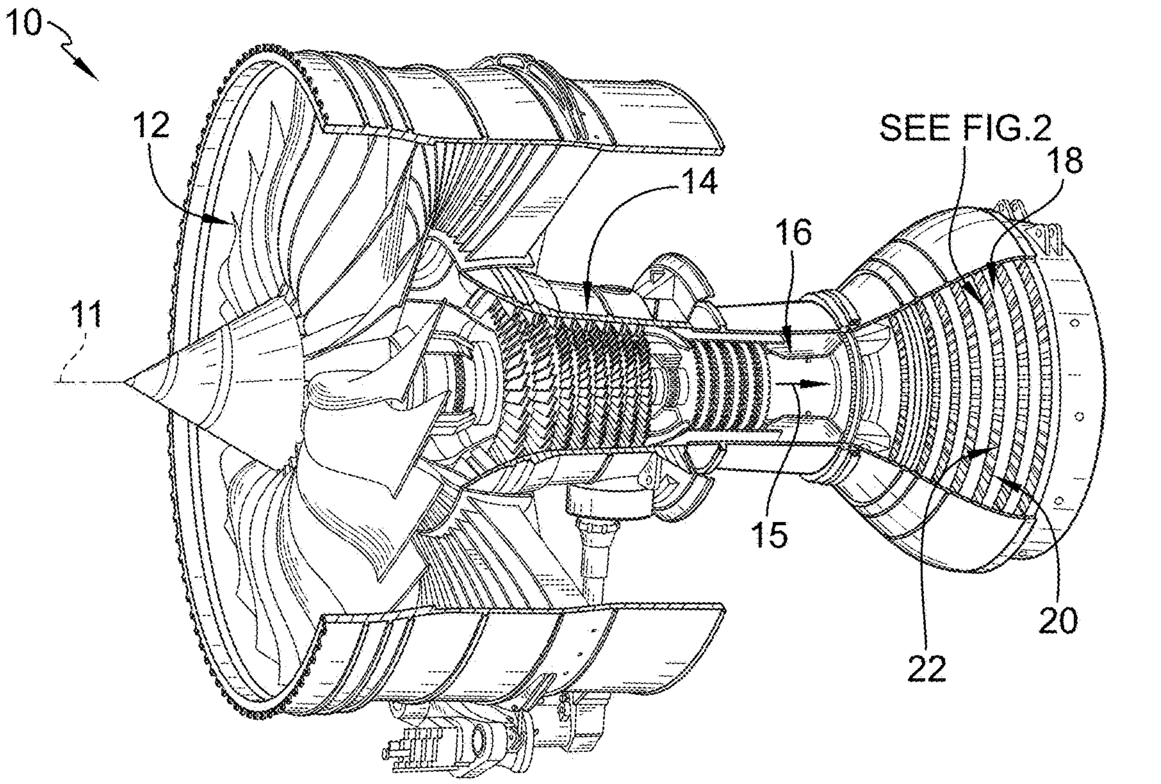
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18, as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
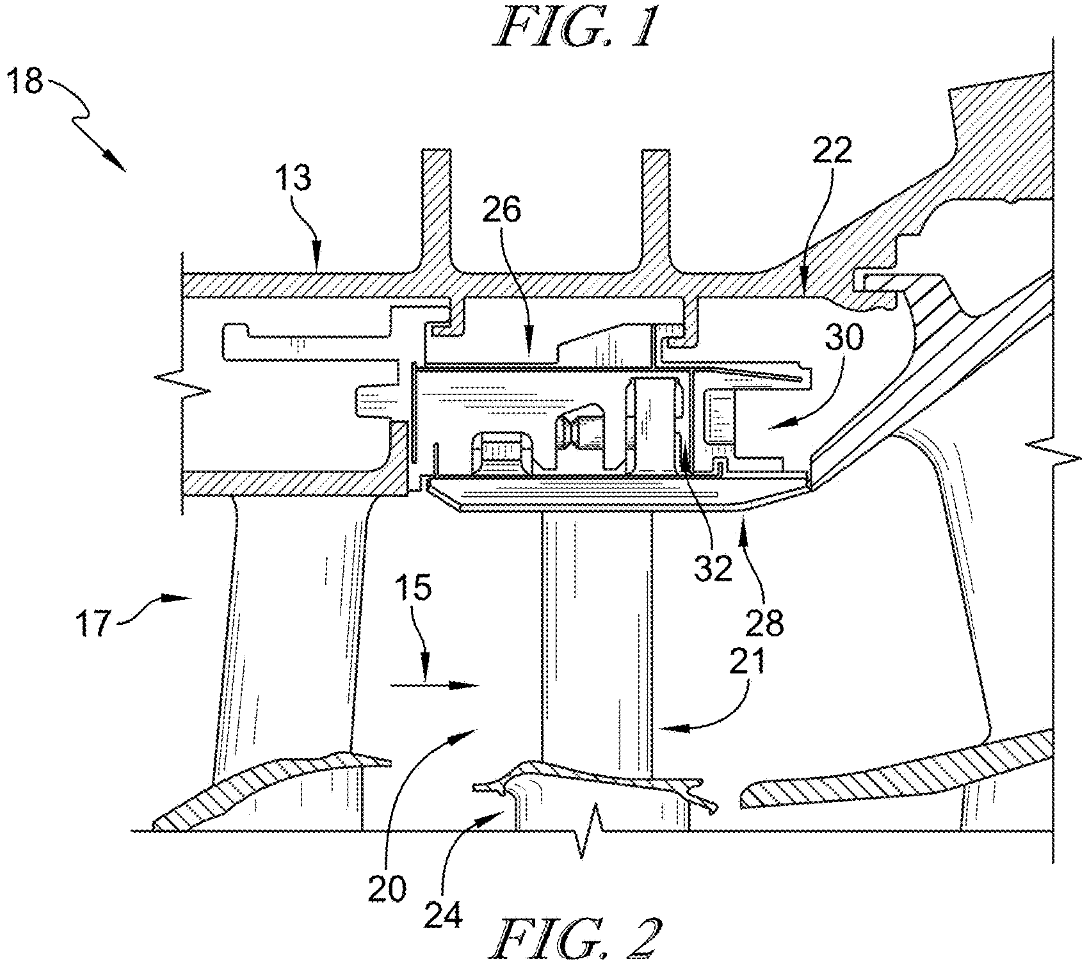
FIG. 2 is a cross-sectional view of a portion of the turbine of FIG. 1 showing a turbine shroud assembly arranged around one of the turbine wheel assemblies, the turbine shroud assembly including a carrier segment coupled with a turbine case, a blade track segment that confronts the turbine wheel assembly and defines a portion of a gas path of the turbine, and a mount assembly that couples the blade track segment with the carrier segment, and further showing that a locating feature extends axially forward from the carrier segment into engagement with the blade track segment to axially locate the blade track segment relative to the carrier segment.

The turbine 18 includes turbine wheel assemblies 20 and turbine shroud assemblies 22 positioned to surround the turbine wheel assemblies 20, as shown in FIGS. 1 and 2. The turbine wheel assemblies 20 include a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 15. The turbine wheel assemblies 20 further include a plurality of vanes 17, as shown in FIG. 2. The turbine shroud assemblies 22 are coupled to an outer case 13 of the gas turbine engine 10 and extend around the turbine wheel assemblies 20 to block gases from passing over the blades 21 during use of the turbine 18 in the gas turbine engine 10.

Figure 3:
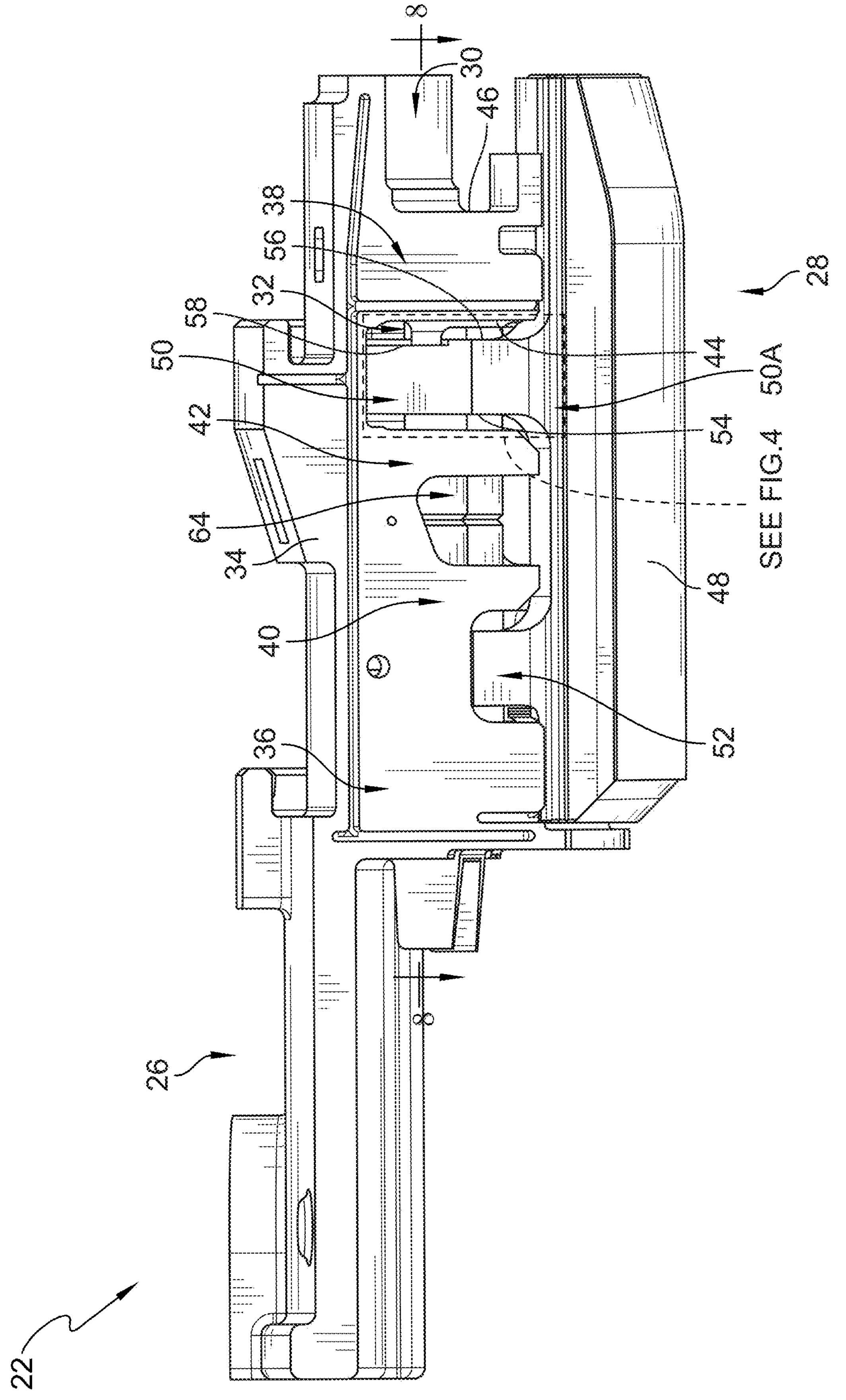
FIG. 3 is a perspective view of the turbine shroud assembly of FIG. 2 showing that the carrier segment includes an outer wall, a first flange that extends radially inward from the outer wall, and a second flange axially spaced apart from the first flange and extending radially inward from the outer wall, and the blade track segment includes a shroud wall, a first attachment flange that extends radially outward from the shroud wall, and a second attachment flange located axially forward of the first attachment flange, and further showing that the locating feature extends axially forward from the second flange of the carrier segment into engagement with the first attachment flange of the blade track segment.

The turbine shroud assemblies 22 are arranged adjacent to one another with a plurality of seals arranged between adjacent turbine shroud assemblies 22 so that the turbine shroud assemblies 22 extend entirely circumferentially about the axis 11. Each of the turbine shroud assemblies 22 includes a carrier segment 26, a blade track segment 28, a mount assembly 30, and a plurality of locating features 32, as shown in FIGS. 2 and 3. The carrier segment 26 is made of metallic materials and arranged circumferentially around the axis 11. The blade track segment 28 is made of ceramic matrix composite materials and is supported by the carrier segment 26 to locate the blade track segment 28 radially outward of the axis 11 to define a portion of the gas path 15. The mount assembly 30 is configured to couple the blade track segment 28 to the carrier segment 26. The plurality of locating features 32 is configured to axially locate the blade track segment 28 relative to the carrier segment 26 so that an axial position of the blade track segment 28 relative to the carrier segment 26 is maintained during use of the respective turbine shroud assembly 22. For example, pressurized air delivered to a cavity in the carrier segment 26 may urge the blade track segment 28 aft.

Figure 8:
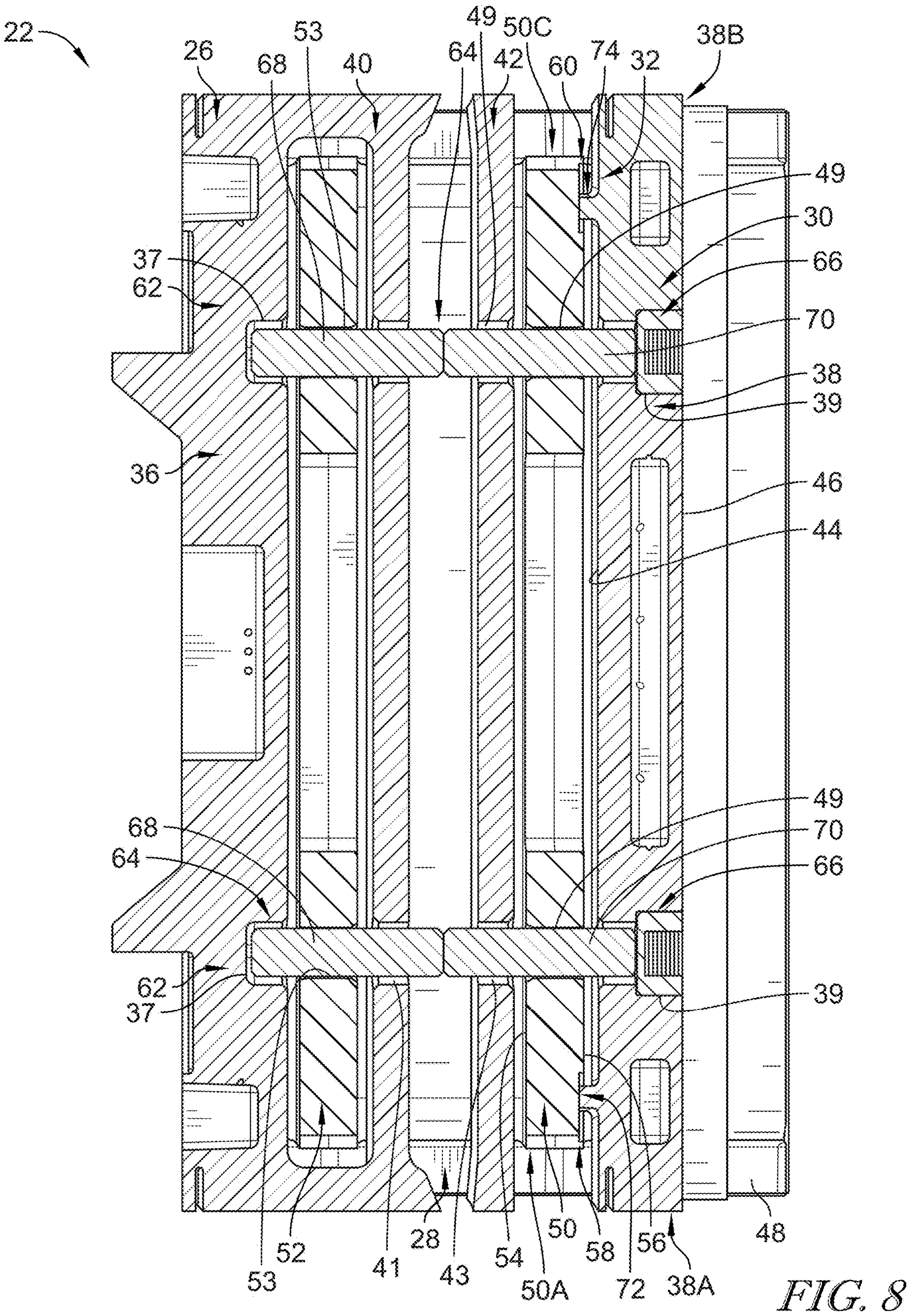
FIG. 8 is a cross-sectional view of the turbine shroud assembly of FIG. 3 taken along line 8-8 of FIG. 3 showing that the two locating features extend axially forward from the second flange into the corresponding recess of the first attachment flange, and further showing that the locating feature is located circumferentially between one of the retainers and a first circumferential end of the turbine shroud assembly and the second locating feature is located circumferentially between the other of the retainers and a second circumferential end of the turbine shroud assembly.

The plurality of locating features 32 extends axially forward from the carrier segment 26 into engagement with the blade track segment 28, as shown in FIGS. 2, 3, and 8. The plurality of locating features 32 contacts and engages the blade track segment 28 to locate the blade track segment 28 axially relative to the carrier segment 26. In this way, the blade track segment 28 may be located at a predetermined axial position in the turbine shroud assembly 22.

Figure 5:
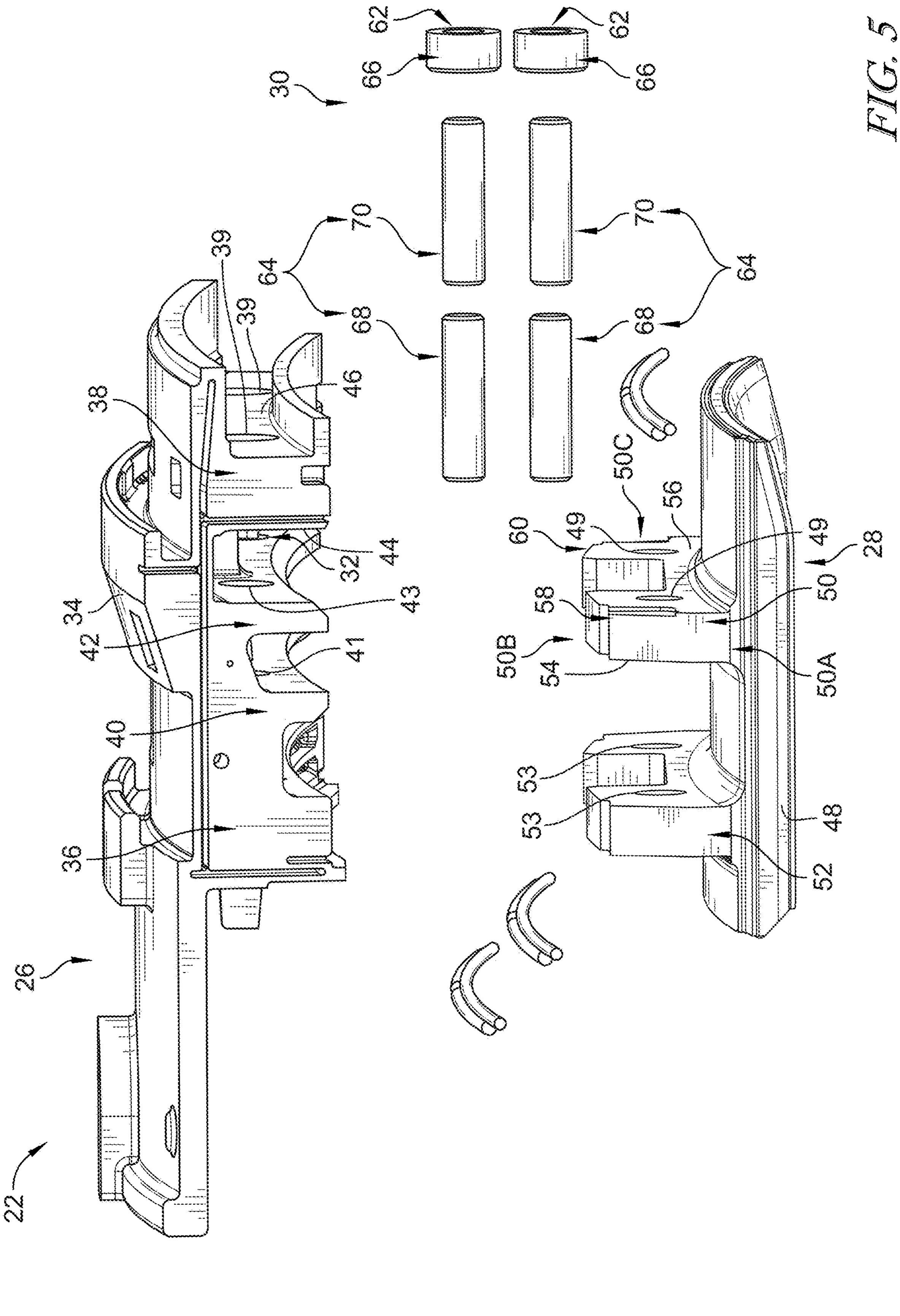
FIG. 5 is an exploded view of the turbine shroud assembly of FIG. 3 showing that the mount assembly includes two retainers that each include a forward mount pin, an aft mount pin, and a plug, the mount pins extend axially forward through the attachment flanges of the blade track segment and the flanges of the carrier segment to couple the blade track segment to the carrier segment and the plug blocks axial movement of the mount pins out of the carrier segment.

The carrier segment 26 includes an outer wall 34 and a plurality of flanges 36, 38, 40, 42, as shown in FIGS. 3, 5, and 8. The outer wall 34 extends circumferentially partway around the axis 11. The plurality of flanges 36, 38, 40, 42 extends radially inward from the outer wall 34, and each has a circumferential extent that extends along the circumferential extent of the outer wall 34.

The plurality of flanges 36, 38, 40, 42 includes a first flange 36 and a second flange 38, as shown in FIG. 3. The second flange 38 is located axially aft of the first flange 36. In the illustrative embodiment, the first flange 36 is located at an axially forward end of the outer wall 34, and the second flange 38 is located near an axially aft end of the outer wall 34.

The plurality of flanges 36, 38, 40, 42 further includes a third flange 40 and a fourth flange 42, as shown in FIG. 3. The third flange 40 is located axially between the first flange 36 and the fourth flange 42, and the fourth flange 42 is located axially between the third flange 40 and the second flange 38. The third and fourth flanges 40, 42 may be inner flanges or clevises that are both located axially inward of the first flange 36 and the second flange 38.

The second flange 38 extends between an axially-forward facing surface 44 and an axially-aft facing surface 46, as shown in FIGS. 3 and 5. The axially-forward facing surface 44 faces toward the fourth flange 42, and the axially-aft facing surface 46 faces away from the fourth flange 42.

The blade track segment 28 includes a shroud wall 48, a first attachment flange 50, and a second attachment flange 52, as shown in FIGS. 3, 5, and 8. The shroud wall 48 is arcuate and extends circumferential partway around the axis 11. The shroud wall 48 also extends a limited axial distance across the axis 11. The shroud wall 48 may extend beyond the second flange 38 in an axially aft direction, as shown in FIG. 3.

The first attachment flange 50 and the second attachment flange 52 are axially spaced apart from one another, as shown in FIG. 3. The attachment flanges 50, 52 extend radially outward from the shroud wall 48. The first attachment flange 50 may extend radially away from the shroud wall 48 the same distance as the second attachment flange 52. The first attachment flange 50 and the second attachment flange 52 provide structure for coupling the blade track segment 28 to the carrier segment 26.

The first attachment flange 50 extends radially outwardly such that the first attachment flange 50 is located axially between the fourth flange 42 and the second flange 38 of the carrier segment 26, as shown in FIGS. 3 and 8. The second attachment flange 52 is located axially forward of the first attachment flange 50. The second attachment flange 52 extends radially outwardly such that the second attachment flange 52 is located axially between the first flange 36 and the third flange 40 of the carrier segment 26.

Figure 4:
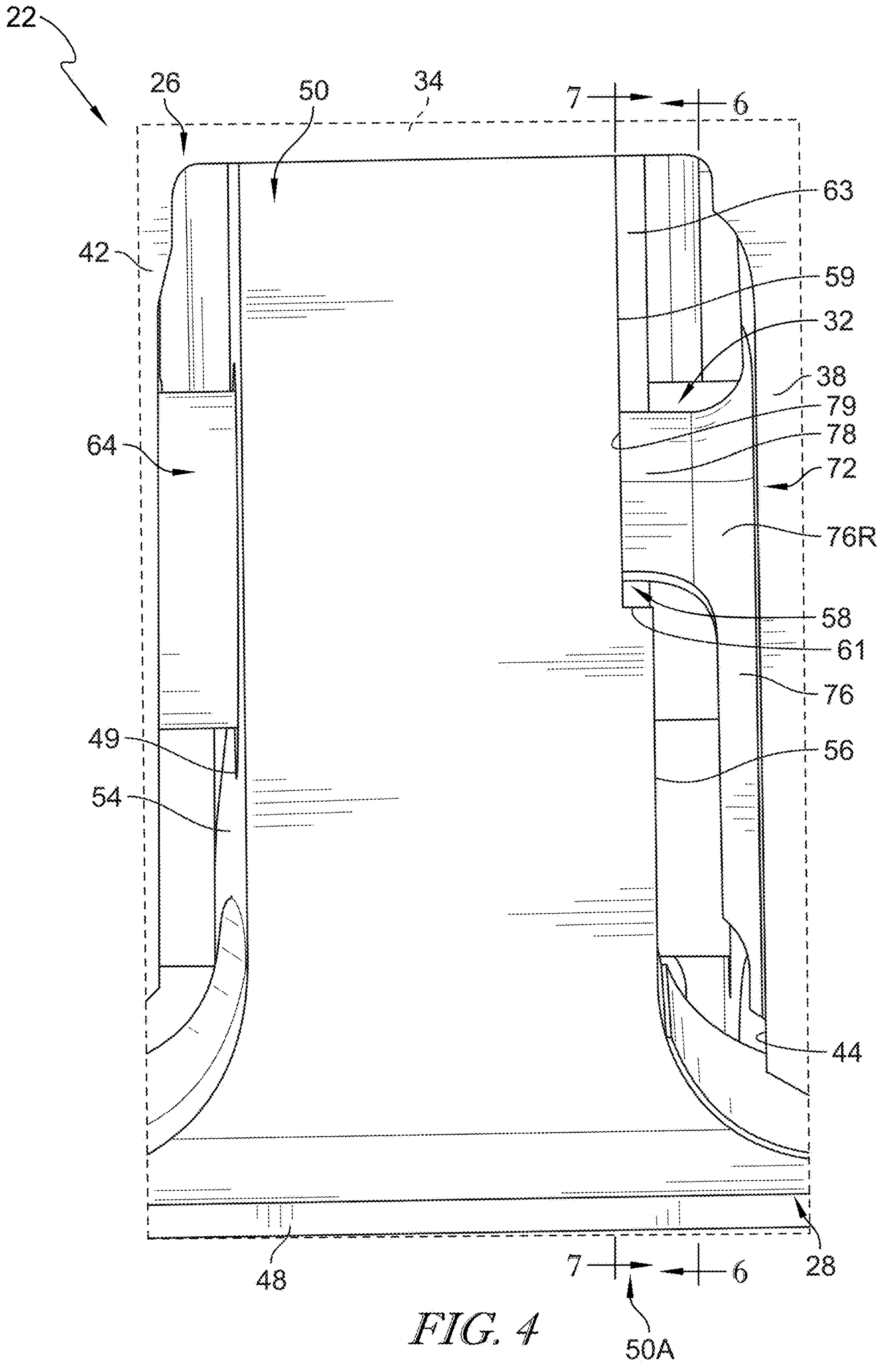
FIG. 4 is an enlarged view of FIG. 3 showing that the first attachment flange is formed to define a recess that extends axially forward into the first attachment flange and the locating feature extends axially forward from the second flange of the carrier segment into the recess to engage the first attachment flange.
Figure 6:
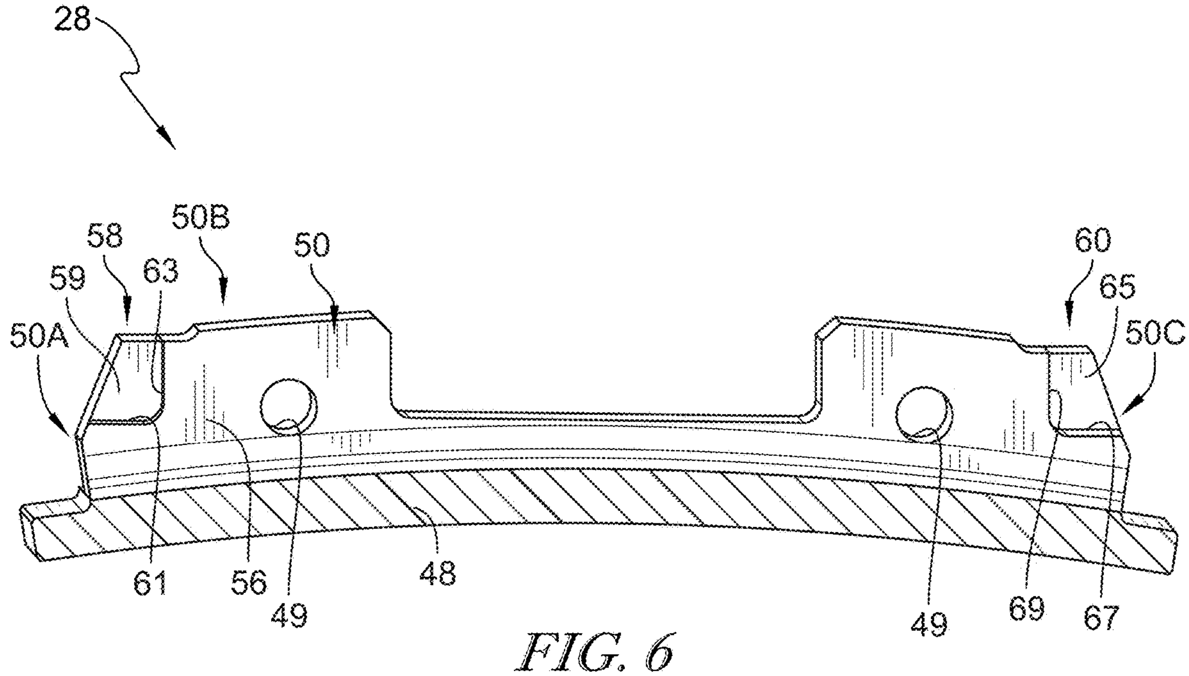
FIG. 6 is a cross-sectional view of the blade track segment of FIGS. 3-5 taken along line 6-6 of FIG. 4 showing that the first attachment flange is further formed to define a second recess circumferentially spaced apart from the recess and extending axially forward into the first attachment flange.

As shown in FIGS. 3 and 4, the first attachment flange 50 defines an axially-forward facing surface 54 facing toward the fourth flange 42 of the carrier segment 26 and an axially-aft facing surface 56 facing toward the second flange 38 of the carrier segment 26. The first attachment flange 50 is formed to define a first recess 58. The first recess 58 extends axially forward into the first attachment flange 50 from the axially-aft facing surface 56 toward the axially-forward facing surface 54 thereof. As shown in FIGS. 4 and 6, the first recess 58 is formed at a first circumferential end 50A of the first attachment flange 50. In this way, the first recess 58 is open at the first circumferential end 50A of the first attachment flange 50. The first recess 58 is also formed at a radial outer edge 50B of the first attachment flange 50. In this way, the first recess 58 is open at the first circumferential end 50A and at the radial outer edge 50B of the first attachment flange 50.

The first recess 58 is defined by an engagement surface 59, a first wall 61, and a second wall 63, as shown in FIGS. 4 and 6. The engagement surface 59 is spaced apart axially forward from the axially-aft facing surface 56 of the first attachment flange 50. In some embodiments, the engagement surface 59 is substantially parallel to the axially-aft facing surface 56. The engagement surface 59 is illustratively a machined surface.

The first wall 61 and the second wall 63 interconnect the engagement surface 59 and the axially-aft facing surface 56, as shown in FIGS. 4 and 6. In some embodiments, the first wall 61 and the second wall 63 are substantially perpendicular to the engagement surface 59 and the axially-aft facing surface 56. The first wall 61 extends axially forward from the axially-aft facing surface 56 to the engagement surface 59, as shown in FIG. 4. The first wall 61 extends circumferentially along the first attachment flange 50 from the first circumferential end 50A thereof, as shown in FIG. 6. The first wall 61 defines a radial inner boundary of the first recess 58.

The second wall 63 extends axially forward from the axially-aft facing surface 56 to the engagement surface 59, as shown in FIG. 4. The second wall 63 extends radially along the first attachment flange 50 from the radial outer edge 50B thereof to the first wall 61, as shown in FIG. 6. The second wall 63 defines a circumferential boundary of the first recess 58.

In some embodiments, the first wall 61 and the second wall 63 are substantially perpendicular to one another, as shown in FIG. 6. The first wall 61 and the second wall 63 may be curved at ends thereof to form a curved connection between the first wall 61 and the second wall 63.

As shown in FIGS. 6 and 8, the first attachment flange 50 is further formed to define a second recess 60. The second recess 60 is circumferentially spaced apart from the first recess 58. The second recess 60 extends axially forward into the first attachment flange 50 from the axially-aft facing surface 56 toward the axially-forward facing surface 54 thereof. As shown in FIGS. 4 and 6, the second recess 60 is formed at a second circumferential end 50C of the first attachment flange 50 opposite the first circumferential end 50A thereof. In this way, the second recess 60 is open at the second circumferential end 50C of the first attachment flange 50. The second recess 60 is also formed at the radial outer edge 50B of the first attachment flange 50. In this way, the second recess 60 is open at the second circumferential end 50C and at the radial outer edge 50B of the first attachment flange 50.

The second recess 60 is defined by an engagement surface 65, a first wall 67, and a second wall 69, as shown in FIG. 6. The engagement surface 65 is spaced apart axially forward from the axially-aft facing surface 56 of the first attachment flange 50. In some embodiments, the engagement surface 65 is substantially parallel to the axially-aft facing surface 56 and the engagement surface 59. The engagement surface 65 is illustratively a machined surface. The first wall 67 and the second wall 69 interconnect the engagement surface 65 and the axially-aft facing surface 56, as shown in FIG. 6. In some embodiments, the first wall 67 and the second wall 69 are substantially perpendicular to the engagement surface 65 and the axially-aft facing surface 56. The first wall 67 extends axially forward from the axially-aft facing surface 56 to the engagement surface 65. The first wall 67 extends circumferentially along the first attachment flange 50 from the second circumferential end 50C thereof, as shown in FIG. 6. The first wall 67 defines a radial inner boundary of the second recess 60.

The second wall 69 extends axially forward from the axially-aft facing surface 56 to the engagement surface 65, as shown in FIG. 6. The second wall 69 extends radially along the first attachment flange 50 from the radial outer edge 50B thereof to the first wall 67, as shown in FIG. 6. The second wall 69 defines a circumferential boundary of the second recess 60.

In some embodiments, the first wall 67 and the second wall 69 are substantially perpendicular to one another, as shown in FIG. 6. The first wall 67 and the second wall 69 may be curved at ends thereof to form a curved connection between the first wall 67 and the second wall 69.

The mount assembly 30 includes two retainers 62 that are circumferentially spaced apart from one another, as shown in FIGS. 5 and 8. Each retainer 62 includes a mount pin 64 and a pin retention plug 66. Each mount pin 64 extends into the carrier segment 26 and the blade track segment 28 to couple the blade track segment 28 to the carrier segment 26. Each pin retention plug 66 is press fit into the carrier segment 26 axially aft of the respective mount pin 64 and circumferentially aligned with the respective mount pin 64 to block removal of the respective mount pin 64 from the carrier segment 26 and the blade track segment 28 and to block axial movement of the respective mount pin 64 relative to the carrier segment 26 and the blade track segment 28.

Each mount pin 64 extends into a corresponding aperture 39 formed in the second flange 38, through a corresponding hole 49 formed in the first attachment flange 50, through corresponding apertures 41, 43 formed in the third and fourth flanges 40, 42, through a corresponding hole 53 formed in the second attachment flange 52, and into a corresponding aperture 37 formed in the first flange 36, as shown in FIGS. 3, 5, and 8. Each pin retention plug 66 is press fit or interference fit in the corresponding aperture 39 formed in the second flange 38 axially aft of the corresponding mount pin 64 to block removal of the corresponding mount pin 64 through the corresponding aperture 39 and to block or minimize axial movement of the corresponding mount pin 64, as shown in FIG. 8.

In the illustrative embodiment, each mount pin 64 includes a forward mount pin 68 and an aft mount pin 70, as shown in FIGS. 3, 5, and 8. The forward mount pin 68 and the aft mount pin 70 of each respective mount pin 64 are circumferentially aligned. The forward mount pin 68 is located axially forward of the respective aft mount pin 70. In this embodiment, the forward mount pin 68 is separate from the aft mount pin 70 so as to allow for independent loading during use in the gas turbine engine 10. The independent loading of the mount pins 68, 70 accommodates manufacturing tolerances and increases the number of loading points for the blade track segment 28. The increased number of loading points decreases localized stresses in the turbine shroud assembly 22.

Figure 7:
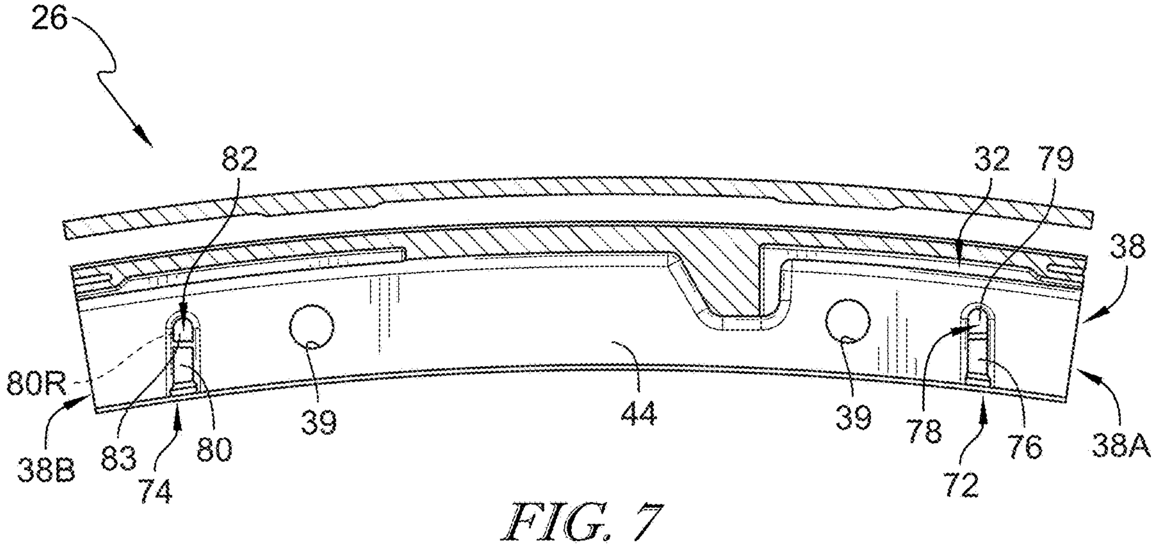
FIG. 7 is a cross-sectional view of the carrier segment of FIGS. 3-5 taken along line 7-7 of FIG. 4 showing that a second locating feature extends axially forward from the carrier segment to extend into the second recess of the first attachment flange of the blade track segment, the second locating feature being circumferentially spaced apart from the locating feature.

The plurality of locating features 32 includes a first locating feature 72 and a second locating feature 74, as shown in FIGS. 7 and 8. Each of the locating features 72, 74 extends axially forward from the axially-forward facing surface 44 of the second flange 38 of the carrier segment 26. The first and second locating features 72, 74 are circumferentially spaced apart from one another.

As shown in FIGS. 7 and 8, the first locating feature 72 is coupled with the second flange 38 adjacent a first circumferential end 38A of the second flange 38. The second locating feature 74 is coupled with the second flange 38 adjacent a second circumferential end 38B of the second flange 38 that is opposite the first circumferential end 38A. In the illustrative embodiment, the locating features 72, 74 are integrally formed with the carrier segment 26.

The first locating feature 72 includes a ridge 76 coupled with the second flange 38 and a protrusion 78 coupled with the ridge 76, as shown in FIGS. 4 and 7. In some embodiments, the ridge 76 is omitted such that the protrusion 78 extends axially forward from the second flange 38. The ridge 76 extends axially forward from the axially-forward facing surface 44 of the second flange 38 and radially outwardly along the second flange 38. The protrusion 78 extends axially forward from a radial outer portion 76R of the ridge 76. In this way, the protrusion 78 extends axially forward from the second flange 38 a greater distance than the ridge 76. The protrusion 78 extends axially forward into the first recess 58 of the first attachment flange 50 of the blade track segment 28 to engage the engagement surface 59 of the first recess 58, as shown in FIG. 4. The ridge 76 is axially spaced apart from the axially-aft facing surface 56 of the first attachment flange 50.

As shown in FIGS. 4 and 7, the protrusion 78 defines an engagement surface 79 that engages and/or contacts the engagement surface 59 of the first recess 58. The engagement surface 79 is an axially-forwardmost surface of the first locating feature 72. While the first locating feature 72 extends into the first recess 58, the protrusion 78 is spaced radially outward from the first wall 61 of the first recess 58, and the protrusion 78 is circumferentially spaced apart from the second wall 63. In this way, the protrusion 78 and the engagement surface 79 thereof are located entirely within the footprint of the first recess 58.

As shown in FIG. 8, the first locating feature 72 is located circumferentially between one of the retainers 62 and the first circumferential end 38A of the second flange 38 of the carrier segment 26. Specifically, the first locating feature 72 is located circumferentially between the aft mount pin 70 of the one of the retainers 62 and the first circumferential end 38A of the second flange 38 of the carrier segment 26.

The second locating feature 74 includes a ridge 80 coupled with the second flange 38 and a protrusion 82 coupled with the ridge 80, as shown in FIG. 7. In some embodiments, the ridge 80 is omitted such that the protrusion 82 extends axially forward from the second flange 38. The ridge 80 extends axially forward from the axially-forward facing surface 44 of the second flange 38 and radially outwardly along the second flange 38. The protrusion 82 extends axially forward from a radial outer portion 80R of the ridge 80. In this way, the protrusion 82 extends axially forward from the second flange 38 a greater distance than the ridge 80. The protrusion 82 extends axially forward into the second recess 60 of the first attachment flange 50 of the blade track segment 28 to engage the engagement surface 65 of the second recess 60, as shown in FIG. 8. The ridge 80 is axially spaced apart from the axially-aft facing surface 56 of the first attachment flange 50.

As shown in FIG. 7, the protrusion 82 defines an engagement surface 83 that engages and/or contacts the engagement surface 65 of the second recess 60. The engagement surface 83 is an axially-forwardmost surface of the second locating feature 74. While the second locating feature 74 extends into the second recess 60, the protrusion 82 is spaced radially outward from the first wall 67 of the second recess 60, and the protrusion 82 is circumferentially spaced apart from the second wall 69. In this way, the protrusion 82 and the engagement surface 83 thereof are located entirely within the footprint of the second recess 60.

In illustrative embodiments, the engagement surfaces 79, 83 of the protrusions 78, 82 are machined surfaces. In such an embodiment, the engagement surfaces 79, 83 are machined so that, due to engagement between the engagement surfaces 79, 83 of the protrusions 78, 82 and the engagement surfaces 59, 65 of the recesses 58, 60, a predetermined distance is provided between a leading edge of the blade track segment 28 and a forward vane 17 (see FIG. 2) and a trailing edge of the blade track segment 28 and an aft vane 17 (see FIG. 2) thereby axially locating the blade track segment 28 therebetween. The forward and aft vanes 17 are located forward and aft of the blade track segment 28, as shown in FIG. 2. The locating features 72, 74, thus, ensure that the leading edge and the trailing edge of the blade track segment 28 are properly located for interfacing with the forward and aft vanes 17. The locating features 72, 74 also ensure that cylindrical and conical portions of the gas path 15 (see FIG. 2) are positioned correctly with the tip of the blade 21 to ensure that the cylindrical portion is aligned with the tip of the blade 21, as shown in FIG. 2.

As shown in FIG. 8, the second locating feature 74 is located circumferentially between the other of the retainers 62 and the second circumferential end 38B of the second flange 38 of the carrier segment 26. Specifically, the second locating feature 74 is located circumferentially between the aft mount pin 70 of the other of the retainers 62 and the second circumferential end 38B of the second flange 38 of the carrier segment 26. The two retainers 62 are located circumferentially between the locating features 72, 74.

The locating features 72, 74 engage, contact, and/or directly contact the first attachment flange 50 of the blade track segment 28 at machined surfaces thereof (i.e., the recesses 58, 60). In this way, the locating features 72, 74 engage the first attachment flange 50 at portions thereof (i.e., the recesses 58, 60) without coatings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a carrier segment arranged to extend circumferentially at least partway around an axis, the carrier segment including an outer wall, a first flange that extends radially inward from the outer wall, and a second flange axially spaced apart from the first flange and extending radially inward from the outer wall, a blade track segment supported by the carrier segment to define a portion of a gas path of the turbine shroud assembly, the blade track segment including a shroud wall that extends circumferentially partway around the axis and a first attachment flange that extends radially outward from the shroud wall, the first attachment flange formed to define a first recess that extends axially forward into the first attachment flange toward the first flange of the carrier segment and a second recess circumferentially spaced apart from the first recess and extending axially forward into the first attachment flange toward the first flange of the carrier segment, and a locating feature engaged with the blade track segment to axially locate the blade track segment relative to the carrier segment so that an axial position of the blade track segment relative to the carrier segment is maintained during use of the turbine shroud assembly, the locating feature extending axially forward from the second flange of the carrier segment into the first recess formed in the first attachment flange of the blade track segment to engage the first attachment flange of the blade track segment.

2. The turbine shroud assembly of claim 1, wherein the locating feature is a first locating feature, and wherein the turbine shroud assembly further includes a second locating feature circumferentially spaced apart from the first locating feature and extending axially forward from the second flange of the carrier segment into the second recess formed in the first attachment flange of the blade track segment to engage the first attachment flange of the blade track segment.

3. The turbine shroud assembly of claim 1, wherein the locating feature is integrally formed with the carrier segment.

4. The turbine shroud assembly of claim 1, wherein the blade track segment further includes a second attachment flange axially spaced apart from the first attachment flange and extending radially outward from the shroud wall, and wherein the carrier segment further includes a third flange located axially between the first flange and the second flange and extending radially inward from the outer wall and a fourth flange located axially between the third flange and the second flange and extending radially inward from the outer wall.

5. The turbine shroud assembly of claim 4, wherein the first attachment flange of the blade track segment is located axially between the fourth flange and the second flange of the carrier segment, and the second attachment flange of the blade track segment is located axially forward of the first attachment flange and axially between the first flange and the third flange of the carrier segment.

6. The turbine shroud assembly of claim 1, wherein the first attachment flange of the blade track segment defines an axially-forward facing surface facing toward the first flange of the carrier segment and an axially-aft facing surface facing toward the second flange of the carrier segment, and wherein the first recess extends into the first attachment flange from the axially-aft facing surface toward the axially-forward facing surface.

7. The turbine shroud assembly of claim 1, wherein the first recess is open on a circumferential end of the first attachment flange.

8. The turbine shroud assembly of claim 1, further comprising a mount pin that extends axially forward into the second flange of the carrier segment, through the first attachment flange of the blade track segment, and into the first flange of the carrier segment so as to couple the blade track segment to the carrier segment.

9. The turbine shroud assembly of claim 8, wherein the locating feature is located circumferentially between the mount pin and a circumferential end of the turbine shroud assembly.

10. The turbine shroud assembly of claim 1, wherein the locating feature includes a ridge that extends axially forward and radially outwardly along the second flange of the carrier segment and a protrusion that extends axially forward from a radial outer portion of the ridge to engage the first attachment flange.

11. A turbine shroud assembly for use with a gas turbine engine, the turbine shroud assembly comprising:

a carrier segment arranged to extend circumferentially at least partway around an axis, the carrier segment including an outer wall, a first flange that extends radially inward from the outer wall, and a second flange axially spaced apart from the first flange and extending radially inward from the outer wall, a blade track segment supported by the carrier segment to define a portion of a gas path of the turbine shroud assembly, the blade track segment including a shroud wall that extends circumferentially partway around the axis and a first attachment flange that extends radially outward from the shroud wall, the first attachment flange formed to define a first recess that extends axially forward into the first attachment flange toward the first flange of the carrier segment and a second recess circumferentially spaced apart from the first recess, and a locating feature engaged with the blade track segment to axially locate the blade track segment relative to the carrier segment, the locating feature including (i) a ridge that extends axially forward from the second flange of the carrier segment and radially outwardly along the second flange and (ii) a protrusion that extends axially forward from a radial outer portion of the ridge to engage the first attachment flange of the blade track segment.

12. The turbine shroud assembly of claim 11, wherein the protrusion of the locating feature extends into the first recess to engage the first attachment flange of the blade track segment.

13. The turbine shroud assembly of claim 12, wherein the first attachment flange of the blade track segment defines an axially-forward facing surface facing toward the first flange of the carrier segment and an axially-aft facing surface facing toward the second flange of the carrier segment, and wherein the first recess extends into the first attachment flange from the axially-aft facing surface toward the axially-forward facing surface.

14. The turbine shroud assembly of claim 12, wherein the first recess is open on a circumferential end of the first attachment flange.

15. The turbine shroud assembly of claim 11, wherein the locating feature is integrally formed with the carrier segment.

16. The turbine shroud assembly of claim 11, wherein the blade track segment further includes a second attachment flange axially spaced apart from the first attachment flange and extending radially outward from the shroud wall, and wherein the carrier segment further includes a third flange located axially between the first flange and the second flange of the carrier segment and extending radially inward from the outer wall and a fourth flange located axially between the third flange and the second flange of the carrier segment and extending radially inward from the outer wall.

17. The turbine shroud assembly of claim 11, further comprising a mount pin that extends axially forward into the second flange of the carrier segment, through the first attachment flange of the blade track segment, and into the first flange of the carrier segment so as to couple the blade track segment to the carrier segment, and wherein the locating feature is located circumferentially between the mount pin and a circumferential end of the turbine shroud assembly.

18. A method comprising:

coupling a blade track segment with a carrier segment to support the blade track segment radially inward of the carrier segment, the carrier segment including an outer wall, a first flange that extends radially inward from the outer wall, and a second flange axially spaced apart from the first flange and extending radially inward from the outer wall, the blade track segment including a shroud wall and a first attachment flange that extends radially outward from the shroud wall and is formed to define a first recess that extends axially forward into the first attachment flange and a second recess circumferentially spaced apart from the first recess and extending axially forward into the first attachment flange, positioning a protrusion of a locating feature in the first recess of the first attachment flange, the locating feature extending axially forward from the second flange of the carrier segment, and engaging the first attachment flange of the blade track segment with the protrusion of the locating feature to axially locate the blade track segment relative to the carrier segment.

19. The method of claim 18, further comprising inserting a mount pin axially forward through the second flange, through the first attachment flange, and into the first flange so as to couple the blade track segment to the carrier segment, and wherein the locating feature is located circumferentially between the mount pin and a circumferential end of the carrier segment.

20. The method of claim 18, further comprising positioning a second protrusion of a second locating feature in the second recess of the first attachment flange, the second locating feature extending axially forward from the second flange of the carrier segment.

* * * * *